United States Patent [19]

Knight et al.

[11] Patent Number: 5,054,090
[45] Date of Patent: Oct. 1, 1991

[54] FINGERPRINT CORRELATION SYSTEM WITH PARALLEL FIFO PROCESSOR

[76] Inventors: Arnold W. Knight; Douglas C. Knight, both of 2105 Mississippi Cir., New Brighton, Minn. 55112

[21] Appl. No.: 555,173

[22] Filed: Jul. 20, 1990

[51] Int. Cl.⁵ ............................................. G06K 9/68
[52] U.S. Cl. .......................................... 382/4; 382/34; 382/42
[58] Field of Search ................... 356/71; 382/4, 34, 42

[56] References Cited

U.S. PATENT DOCUMENTS

| | | | |
|---|---|---|---|
| 3,527,535 | 9/1970 | Monroe | 382/4 |
| 3,968,476 | 7/1976 | McMahon | 382/4 |
| 4,246,568 | 1/1981 | Peterson | 382/33 |
| 4,547,864 | 10/1985 | Kawabata | 382/42 |
| 4,641,350 | 2/1987 | Bunn | 382/34 |
| 4,690,554 | 9/1987 | Froelich | 382/4 |

OTHER PUBLICATIONS

Arnold W. Knight, Richard J. Grommes, David L. Hagen, U.S. Air Force Report BMOTR-85-37, "Rapid and Accurate Personnel Identification System", Jun. 1, 1985.

*Primary Examiner*—Leo H. Boudreau
*Assistant Examiner*—Barry Stellrecht
*Attorney, Agent, or Firm*—D. L. Tschida

[57] ABSTRACT

A method and apparatus for parallel processing "live" and pre-recorded "reference" fingerprint data for comparison purposes. An array sensor images a selected portion of a live fingerprint and video means produce corresponding digital live image data. The pre-recorded, multi-pixel reference data and the image data are scanned relative to one another via recirculating First-in-First-Out (FIFO) buffer memories and row and column shift means. Exclusive OR (XOR), summation and accumulation circuitry simultaneously compare the reference and image data over a plurality of correlation cycles and compute a correlation value for each correlation cycle. A microprocessor determines the best correlation value of the reference and image data from a tabular store of correlation values for each correlation cycle relative to a PASS/FAIL threshold.

17 Claims, 6 Drawing Sheets

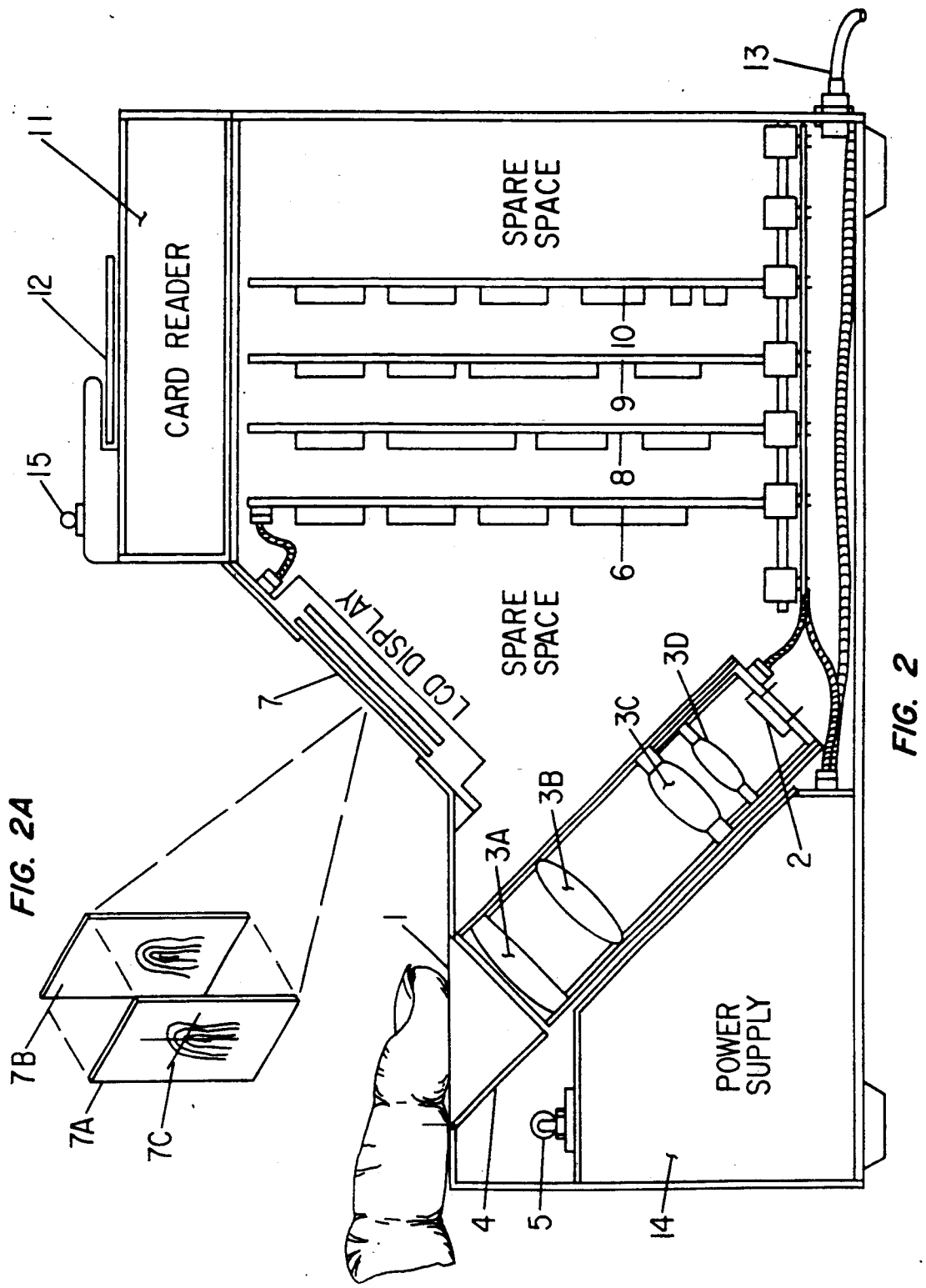

REFERENCE SELECTION

CORRELATION PROCESS

FINGERPRINT CORRELATION SYSTEM WITH PARALLEL FIFO PROCESSOR

BACKGROUND OF THE INVENTION

1. Field of the Invention.

This invention relates to fingerprint comparison apparatus and, in particular, to a system using recycling FIFO buffer memories to perform parallel processing of a correlation algorithm to determine an "electronic" match between a portion of a reference fingerprint and a live fingerprint.

2. Description of the Prior Art

Matching or comparing of fingerprints to assure a person's identity has been used and accepted for several decades. Apparatus which have been developed to date use minutiae methods, optical correlation and large computers with sophisticated software based programs to perform the comparison or identification. U.S. Pat. No. 4,246,568, discloses one device of which Applicants are aware that uses a minutiae method. U.S. Pat. No. 4,690,554 otherwise discloses a device that uses optical correlation.

Although some of these approaches have functioned to some degree, they are rather complex and expensive. They also lack in accuracy and robustness. That is, the minutiae method uses about 10 to 30 physical reference points within a fingerprint to determine a match, whereas the subject correlation method uses 1600 or more points, thus providing better accuracy. The simplicity of the correlation algorithm and hardware implementation result in a lower cost system. Robustness is achieved via an ability to obtain correct results even if several of the information pixels are missing or in error, due to the statistical nature of the algorithm.

Applicants are also aware of a serial software correlation approach, which can be found in a U.S. Air Force report, BMO TR-85-37, dated June 1, 1985. A software algorithm is disclosed therein which is implemented in an assembly language programmed general purpose computer. Although the system demonstrates relatively good Type II accuracy (i.e. rejection of the wrong person), the serial operation of the correlation algorithm produces a relatively slow throughput performance.

The FIFO based parallel pre-processor implementation of the present invention addresses the speed and cost deficiencies inherent in the foregoing software implementation. The resulting system can be used for credit/bank card validation, personnel access control, computer security and other similar applications.

SUMMARY OF THE INVENTION

Accordingly, it is a primary object of the present invention to provide a low cost, dedicated, hardware implemented correlation system for fingerprint identification.

It is a further object of the invention to provide a system, including a recycling FIFO based hardware preprocessor, which performs a parallel processing correlation function upon real time binary video data sampled from a predetermined print area of a subject in relation to pre-recorded reference data.

It is a further object of the invention to restrict the scanned portion of the total fingerprint area to avoid problems with skin distortion and skew.

It is a further object of the invention to use a prism to simplify the design and control misalignment resulting in a fingerprint image which has an aspect ratio of less than the full scale dimension in one axis (e.g. 0.707x).

It is a still further object of the invention, to integrate the subject parallel correlation function into a relatively small number of integrated circuits, preferably a single integrated circuit, whereby the speed and low cost necessary to provide a commercially viable product are obtainable.

In a presently preferred construction of the invention, a live print sensor images a selected print area via a backlit critical angle prism and lens system. The live image data is collected at an array sensor of either a charge coupled device (CCD) or other construction and is displayed on a first display means in relation to a second display means exhibiting known sampled reference data. In one embodiment, the live data is particularly superimposed over the reference data which is obtained from a recorded, user provided media. The double layered display assists an operator in positioning of the live data relative to the reference data whereby the veracity of subsequent processing is facilitated.

The reference data is used as a multi-pixel cursor to overlay and electronically scan a larger selected area of the live video data. The reference cursor is vertically and horizontally scrolled over the live print data via a row and column shift means. Summation and accumulation means correlate the reference and live data at a number of correlation locations or points over the area of the live print data, with resulting correlation values being stored in memory. The reference data comprises a matrix of $n_x \times n_y$ pixels and the live data comprises a matrix of $m_x \times m_y$ pixels, where $m > n$, which results in a correlation array of $(m_x - n_x + 1) \times (m_y - n_y + 1)$. Conversely, if the reference data matrix is greater than the live data ($n > m$), the live data is scrolled relative to the reference data. The correlation value at each correlation point can alternatively be determined in either a parallel or serial summation process.

A microprocessor determines a PASS/FAIL condition by comparing the correlation values of each correlation point relative to a predefined threshold.

Still other objects, advantages and distinctions of the invention, as well as the details of one presently preferred construction, will become more apparent upon reference to the following description with respect to the appended drawings. To the extent modifications or improvements thereto have been considered they are described as appropriate. The following description should not be interpreted in strict limitation of the scope of the invention, which should instead be interpreted within the scope of the following claims.

BRIEF DESCRIPTION OF THE DRAWINGS

FIG. 2 shows a side plan view of one implementation of the present fingerprint identification system, which uses a data storage card for reference fingerprint storage.

FIG. 2A shows a double layered LCD display including a reference and a live image to assist in finger placement on the platen.

DESCRIPTION OF THE PREFERRED EMBODIMENT

The correlation algorithm of the present invention, compares a reference fingerprint with a live fingerprint by electronically moving a selected, pre-recorded, multi-pixel reference "cursor" over a live fingerprint image and determining the best match or correlation value. This value is compared with a selectable threshold value and, if the match is better than the threshold value, the identification is positive. If not, the identification is negative and is rejected. Alternatively, if the live image is smaller than the reference image, the live image is scrolled over the reference image vertically and horizontally.

The reference fingerprint is taken from a storage device containing pre-digitized and known subject data. The live fingerprint is obtained by placing a subject's finger on a backlighted platen which is viewed by a sensor that images and digitizes the fingerprint.

Figure 1:
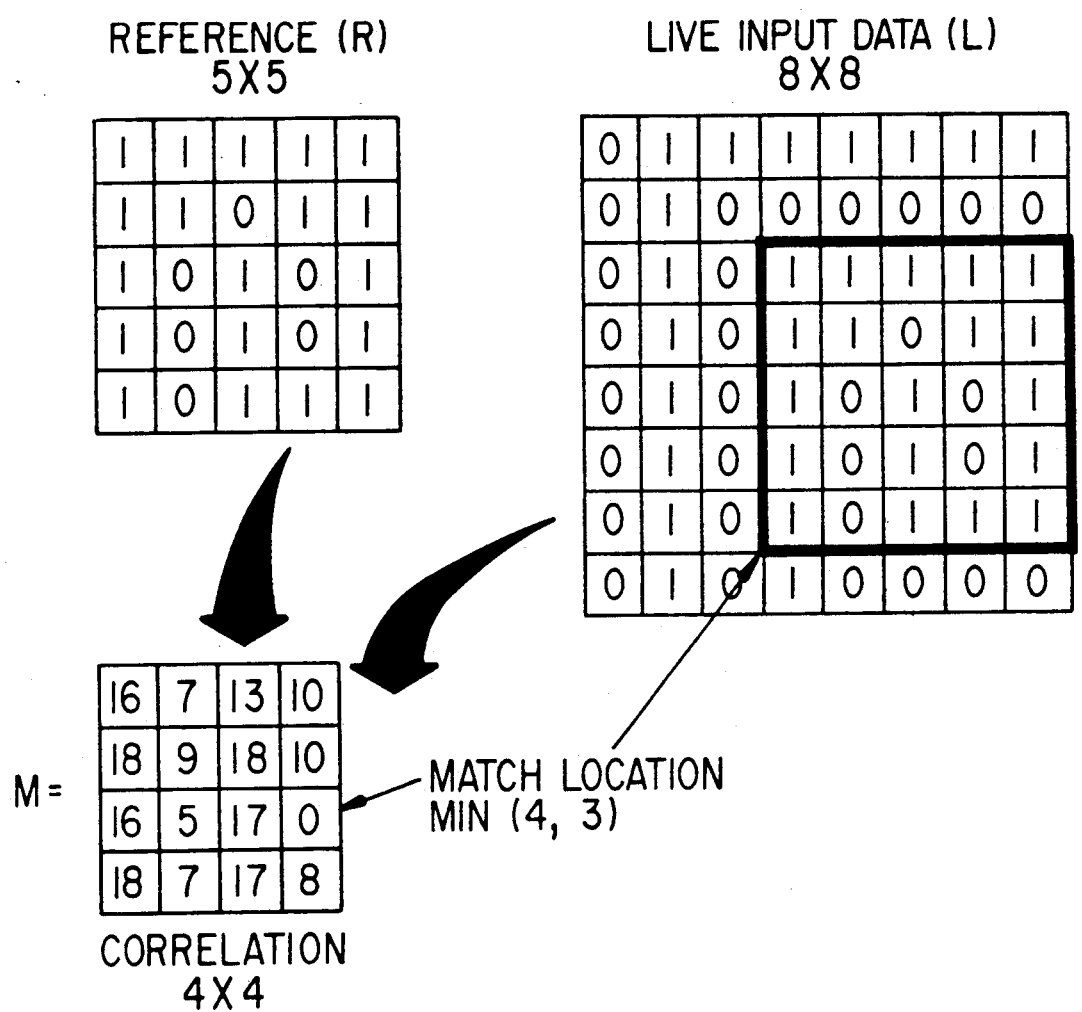
FIG. 1 is a drawing illustrating the basic correlation function as used with binary pixel data for fingerprint identification.

For illustration purposes and with reference to FIG. 1, it is assumed that the processor has access to an $m_x \times m_y$ array (e.g. $8 \times 8$ pixels) of live binary pixel data, along with a reference pattern of $n_x \times n_y$ pixels, where $m > n$. If a $5 \times 5$ reference array of previously digitized binary data is used for the comparison, an interactive correlation can be performed by horizontally and vertically scrolling the $5 \times 5$ reference "cursor" across the $8 \times 8$ live data and determining the binary match for all positions of the reference data at each shift location, which produces a $4 \times 4$ correlation array.

This process is exemplified by placing the $5 \times 5$ reference "cursor" in the upper left corner of the live data and calculating the correlation value. Subsequently, the cursor is moved to each other possible correlation location as the cursor is horizontally and vertically shifted over the $4 \times 4$ correlation area. At each location a correlation value is calculated by summing of the number of pixels which match. The correlation value from each location is stored in memory for threshold processing.

A $4 \times 4$ correlation array results from the foregoing comparison and summing at all 16 possible correlation locations. The particular correlation value at each location is calculated by summing the absolute differences between the live data and reference data at each location as follows.

$$M(K,L) = \sum_{i=0}^{4} \sum_{j=0}^{4} |L(K+i, L+j) - R(i,j)|$$

for $K = 0$ to 3 and $L = 0$ to 3.

This correlation function produces a minimum value at the point of closest match.

For binary data, the absolute value of the difference between the reference and the live data is replaced by an exclusive or Boolean (XOR) function. This produces a "1" if the points are different, and a "0" if they are identical. Conversely, the function can be inverted by using "NOT.XOR" to compare the two points. This produces a maximum or peak at the point of closest match. In either case, the horizontal and vertical shifting, comparison, summing and storing functions can be performed using digital processing techniques.

Before discussing the specific details of the circuitry which performs the correlation function of the present invention with respect to FIGS. 3A-3D and 4A and 4B, attention is directed to FIG. 2 and wherein the mechanical construction of the reader/comparator is shown. A fingerprint identification system for a credit/bank card application is particularly depicted. The unit is housed in a small enclosure 32, approximately $6 \times 8 \times 12$ inches in size. Size, however, is for reference only and may vary.

The operation of the system is described as follows. A subject's finger is placed on a critical angle prism 1 which impresses an image on the surface of the prism 1. An image sensor 2 (i.e. a CCD array) views the finger through an optical lens system 3, comprised of a plurality of lenses 3A-3D. The prism 1 is backlit by an electroluminescent light panel 4 to provide uniform background lighting. Alternatively, a frosted glass (not shown) may be substituted for the light panel and used in combination with a lamp 5.

Conventional camera electronics and analog-to-digital (A/D) conversion circuitry are located on the printed circuit board 6. This board also provides an interface to a liquid crystal display (LCD) 7. The LCD display 7 is used to display the live and reference fingerprints for visual reference. It can also be used to provide messages to the user, including PASS/FAIL results.

For credit card applications and with further attention to FIG. 2A, a double layered LCD display 7 is used to assist the subject in obtaining a relative alignment of the live fingerprint, which is displayed at layer 7A, relative to the reference fingerprint, which is displayed at layer 7B. For more stringent security requirements, a "crosshair" reticle 7C can be used on a single display layer, with the fingerprint "key" position being known only to the subject.

A first-in-first-out (FIFO) pre-processor board is shown at 8. It is implemented in large scale integrated (LSI) chips to reduce the number of components and allow implementation on a single board.

The next printed circuit board is the microprocessor board 9, which is the controller for the system. It is implemented in conventional fashion using discrete components but could be implemented in LSI chips.

The last board 10 is an interface board which communicates with a data storage reader 11. The depicted reader 11 uses a digital data card 12 whereon the fingerprint data for the subject is contained. Interfacing techniques are well known and can include electrical contact or non-contact storage card devices 12. In all events, however, data is stored on the reference media for one or more selected areas of the subjects' fingerprints, and relative to which, upon alignment of the live fingerprint with respect to the reference data, a comparison can be made.

Where a centralized reference data base is used, the microprocessor 9 would typically be interfaced with a magnetic disk, optical disk or another peripheral mass storage media via a serial or parallel data link 13, such as RS-232 or fiber optics link.

Finally, a power supply 14 provides dc power for the system. An LED or other lamp 15 indicates a PASS/FAIL condition to the machine operator or checkout clerk. Typically provided power switches, fusing and other necessary support functions, which may be required, are not shown.

Figure 3A:
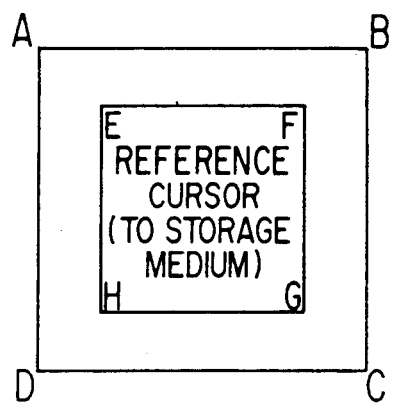
FIGS. 3A, 3B, 3C and 3D show a series of illustrations depicting the correlation process as implemented using the recycling FIFO correlation method of the invention.

FIGS. 3A-3D pictorially describe the fingerprint registration (i.e. storage) and comparison or correlation processes. The comparison is performed by the recycling FIFO circuitry shown at FIGS. 4A and 4B. During registration, a reference area, smaller than the entire live fingerprint area (e.g. 40×40 pixels), is selected from the middle of a 64×64 pixel video image as shown in FIG. 3A. This binary reference area is then stored on some readily available and durable storage media, such as a data card, magnetic disk or optical disk. The data is thereby available for recall and comparison.

Figure 3B:
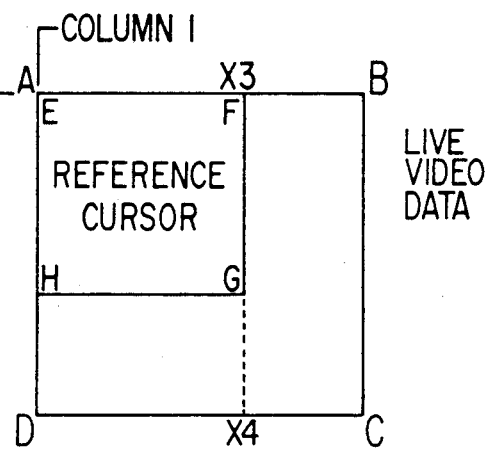

Correlation is performed by recalling the reference data from the storage medium and using the data as a large 40×40 pixel "cursor" which is superimposed over live fingerprint data taken from a subject as shown in FIG. 3B. The reference cursor is then scrolled over the entire live print area in the fashion of the example of FIG. 1 to determine the best match or correlation value.

Figure 3C:
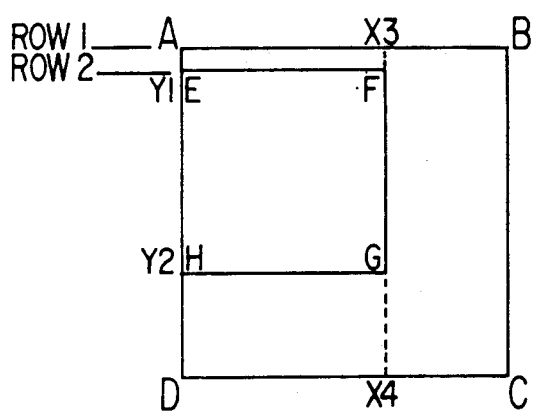
Figure 3D:
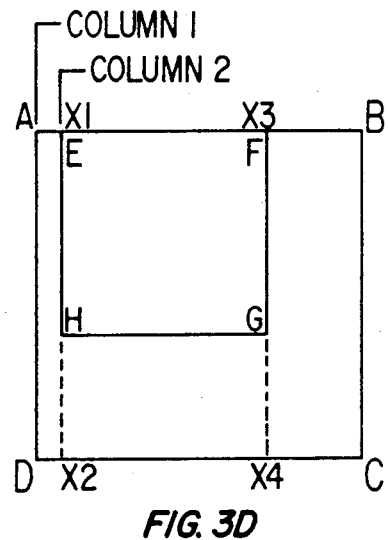

Movement of the reference cursor begins at the upper left corner of the live image, as shown in FIG. 3B, and advances one row at a time, as depicted in FIG. 3C, down to the bottom of the area defined by the coordinates [A,X3,X4,D]. The reference cursor is then returned to its initial position and advanced one column to the right as shown in FIG. 3D. The above process is repeated until the entire live fingerprint area has been scanned. A correlation value is obtained at each of the 625 possible correlation points and all 625 correlation values are stored in random access memory (RAM) for thresholding by the microprocessor 9.

At the microprocessor 9, each value is compared with a predetermined threshold value. If the correlation value is better than the threshold value, a "good" match is declared and a PASS is indicated. If not, a FAIL is indicated. The thresholding process can be performed either, while the correlation function is in process or after completion of the 625 correlation checks.

Figure 4A:
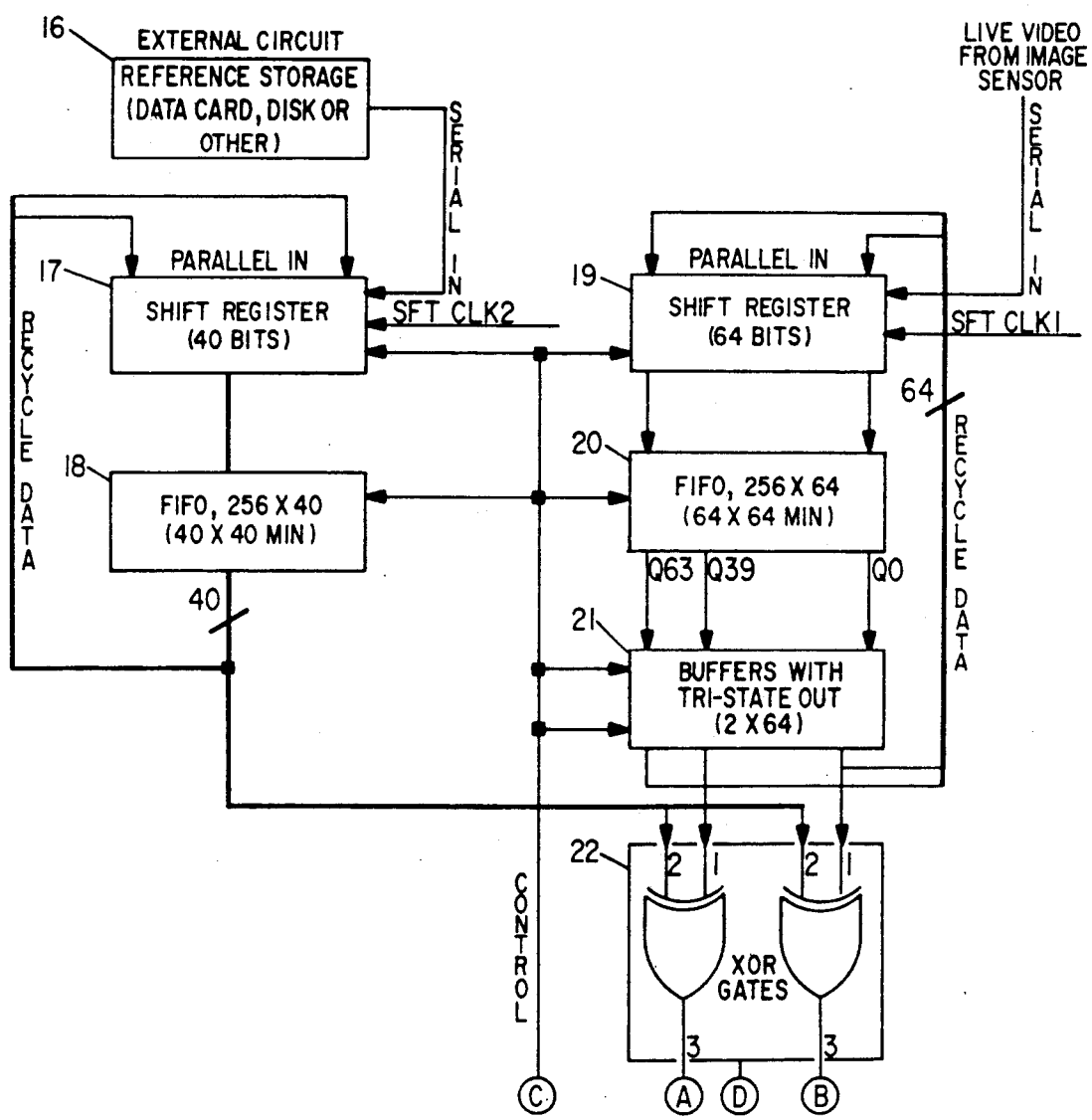
FIGS. 4A and 4B show a functional block diagram of the recycling FIFO circuitry of the invention, which uses XOR gates and accumulation means to correlate live sample data with stored reference data.
Figure 4B:
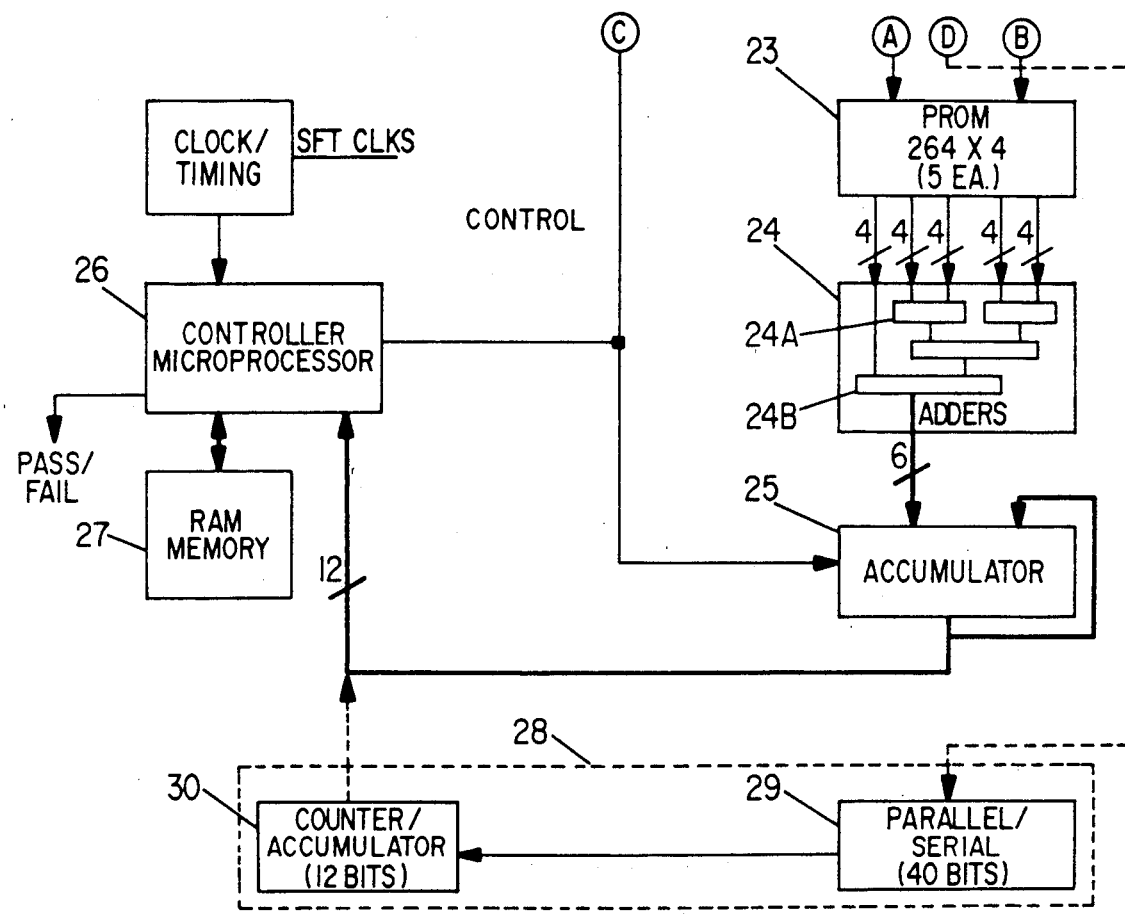

Relating the above processing approach to a hardware implementation, FIGS. 4A and 4B show a functional block diagram of related circuitry which Applicants have developed. This circuitry uses a pair of recycling FIFO memories, row and column shift means, a correlation value accumulator and microprocessor with RAM memory to determine a PASS/FAIL condition.

Referring to FIG. 4A, the reference data is recalled from the reference storage media 16 using a serial (or parallel) data bus and loaded into a shift register 17, one complete line or row of 40 bits at a time. From there it is transferred into a 256×40 bit FIFO buffer 18, where the data forms a 40×40 bit (pixel) reference "cursor" that is used for subsequent processing. If the buffer size exceeds that of the cursor, the unused buffer locations are disabled so as not to affect data throughput.

Live video fingerprint data is, in turn, obtained from the prism 1 and camera circuitry 6 and sent to a one bit A/D converter (not shown). From there each line or row of live binary video is shifted into a 64 bit shift register 19. When the register 19 is full, the data is transferred into a 256×64 bit FIFO buffer 20 and the next row of video data is shifted into the register 19. This process continues until the 64×64 pixel video image is stored in the FIFO 20.

Although an area of 64×64 bits of live image data are used for the present embodiment, the image area can be varied. Similarly, the size of the reference cursor and FIFOs 18 and 20 can be varied. If 256×256 pixels of live data are used, a 4 to 1 compression of the data can be made. Alternatively, a live print area of 64×64 bits can be selected from the larger 256×256 area using gating techniques. Compression and gating techniques are well known.

Figure 5:
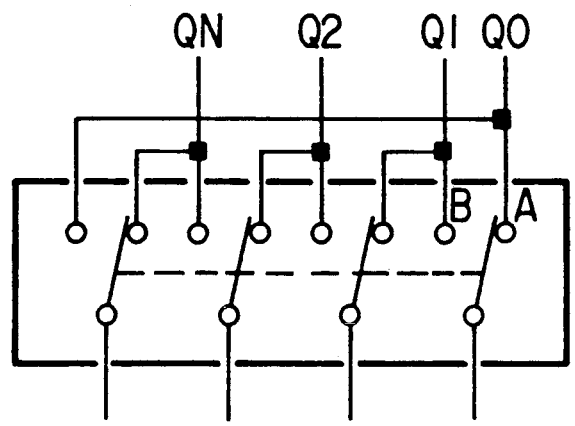
FIG. 5 shows a symbolic representation of the tri-state buffer switches.

With the reference data and the live data respectively stored in FIFOs 18 and 20, the processing is ready to begin. A bank of 40 single-pole-double-throw switches, which may be implemented using tri-state buffers 21, is connected at the output of the live image FIFO buffer 20. FIG. 5 shows a symbolic representation of such a switch bank.

With bank A of the tri-state buffer 21 selected, the correlation process begins and during which the image data of the reference FIFO 18 and the live FIFO 20 are simultaneously clocked via the tri-state buffer 21 into the exclusive OR (XOR) gates 22. There all 40 bits of each row of reference data are compared to a selected 40 of the 64 bits of each row of live image data. Each row of data is subsequently recycled in parallel to the inputs of the FIFOs 18 and 20. This process continues through each of the 40 rows of reference data (i.e. 40 clock cycles) until all the reference data has been compared on a line-by-line basis with the overlapping portion of the live print data.

The correlation process then moves to the next lower correlation location, one row down as shown in FIG. 3C. This is accomplished by holding the reference FIFO 18 data in its initial state while the live FIFO 20 is shifted one row. That is, with the reference image frozen as its initial state and the live image data also having been returned to its initial state, the live image data is clocked one row further, which brings the second row of live data into position to be compared with the first row of reference data. The XOR processing function is halted during the row shift operation by disabling the accumulator 25 or 28 (reference FIG. 4B).

The reference and the live data from FIFOs 18 and 20 are then again fed into the XORs 22, as with the initial comparison, and the process cycles through the 40 rows of reference data until the reference FIFO 18 again returns to its initial state. The data of reference FIFO 18 is again held in position and the live FIFO 20 is advanced until it returns to its initial, once shifted position. It is then advanced one row further, which locates the third row of live data into position to be compared with the first row of the reference data. This row shift and cycle process continues until the reference image data has been correlated over all twenty-five possible image correlation locations, thus completing the correlation of the live print area defined by the coordinates [A,X3,X4,D] in FIG. 3C.

With both the reference and the live image data returned to their initial states in the FIFOs 18,20, the circuitry next shifts the live image data over one column (reference FIG. 3D) and repeats the above row shifting/comparison process. Column shifting is achieved by enabling bank B of the tri-state buffer 21. This couples the next adjacent forty columns of live image data into the XORs 22, which data is also recycled to the input of shift register 19. The B bank of switches are only selected for one complete comparison cycle of the first row of column shifted, live image data and after which he data of each row contained in FIFO buffer 20 has been shifted one column position. The tri-state switches 21 are then returned to their normal A or non-shift position, and the remaining rows are compared. Thus the reference image is again correlated against the live image data, but shifted one column.

When the reference data correlation is completed for the live image area [X1,X3,X2,X4](reference FIG. 3D), the column shift function is enabled in a similar fashion as described above to select the next adjacent column of 40 rows. The row and column shifting process is repeated, until the entire live image area has been correlated with the reference cursor and a 25×25 correlation table is produced. Once completed, the reference image and the live image data are returned to their initial states within the FIFOs 18, 20 and the correlation process ends.

As the reference and live image data are clocked from the FIFO buffers 18 and 20, the XOR gates 22 compare all 40 bits of each row of reference data to each selected row of 40 bits of live data. A binary "1" is produced, if the bits are the same, or a "0", if the bits are different. Alternatively, a "0" could indicate the bits are the same and a "1" that the bits are different.

The correlation function requires that the total number of 1's (or 0's) be accumulated for each entire reference area as shown in FIGS. 3C and 3D for each cycle and stored for further threshold processing. Two considered methods for doing this are parallel accumulation and serial accumulation. The parallel approach is defined first.

For the parallel approach, the 40 bits of 1's and 0's for each row of data provided from XOR circuitry 22 are divided into 5 sectors of 8 bits each. The number of sectors results from the size of the PROM used and its available address lines. A 256 byte PROM has 8 address lines. Thus with a 40 bit line of data, 5 sectors result and 5 PROMS are required. The number of one's imposed on the sector address lines is pre-stored as a look-up-table in the memory location identified by that address. Each possible sector, in turn, is treated as a unique address of a 256×4 PROM 23, which may comprise an EEPROM, UVPROM or other equivalent. Any given number of 1's thus appearing at the XOR output for each sector defines an addressable memory location in PROM which contains predetermined data. When the addresses of the PROM are later accessed, the specific number of contained 1's is selected and output in hexidecimal format.

Adder circuitry 24 receives the sector data and sums the number of 1's in each row. Four bit parallel adders 24A are particularly used to add the number of 1's for each adjacent two sectors. The output from the adders 24A are, in turn, cascaded into 6 bit parallel adders 24B which sums the entire line. The resultant output from the adder circuitry 24 thus contains the total number of 1's or bit matches within each 40 bit row, which requires 6 bits of the resolution.

The total number of 1's for the total reference area of 40 rows is next accumulated. This is achieved by coupling the output of the 6 bit adder 24A into a 12 bit accumulator 25 where the data from each row is summed. A running total is thereby contained in the accumulator 25. A perfect match would be indicated by a total of 1600 matching "1's" or "0's", depending upon the selected convention. Commonly, however, the contents of the accumulator will indicate less than a perfect match.

As each correlation is completed, the contents of the accumulator 25 is transferred to the microprocessor 26 for storage in RAM 27 and later threshold processing. This procedure continues until the entire FIFO processing function, described previously, is complete and all 625 (25×25) possible correlation locations have been stored in RAM 27. Alternatively, threshold processing can be performed as the data enters the microprocessor 26, in which case, RAM storage is not required for all 625 correlation location values.

Figure 6:
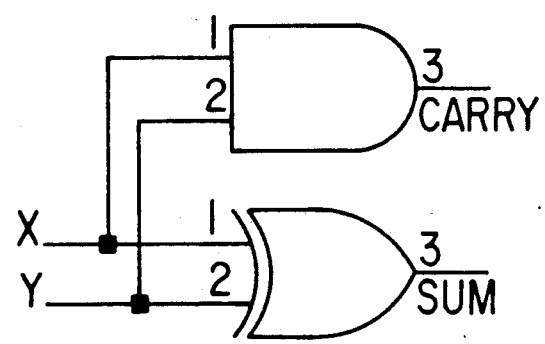
FIG. 6 shows a symbolic representation of the half adders used as an alternative method for parallel accumulation of the row correlation bits.

An alternative summation method which might be used instead of PROM 23 for summing the number of 1's from the XOR circuitry 22 is to use half-adders. For this instance, twenty half-adder circuits are used to sum adjacent outputs from the XOR circuitry 22. A typical half-adder circuit element is shown in FIG. 6.

Otherwise, appreciating that accumulation can occur in a serial fashion, attention is directed to the circuitry of FIG. 4B. This circuitry can be substituted for the PROM 23, adder circuitry 24 and accumulator 25. While producing a similar result and with less hardware, such a serial accumulator 28 is much slower than the parallel implementation described above. A high speed shift clock, however, could be used to speed up the process and make the serial accumulator viable.

In any case, a 40 bit parallel to serial shift register 29, instead of the PROM 23, is connected to the output of the XOR circuitry 22. As each row is processed through the XOR gates 22, it is shifted into a 12 bit counter/accumulator 30, which counts and accumulates the number of 1's as they are entered. When the correlation of the area of each correlation location is completed, the value in the counter/accumulator 30 is transferred to the microprocessor 26 for storage in RAM 27 and thresholding. Thresholding by the microprocessor 26 is the same as for the parallel accumulator 25.

The remaining task is to determine if a fingerprint match exists. The microprocessor 26 performs this function by comparing the value of each correlation area stored in RAM 27, with a preset threshold value. If the value of any or some specified number or combination of the correlation locations exceed the threshold, a correlation match exists. The microprocessor 27 then outputs a PASS. If the threshold criteria is not met, the microprocessor 26 outputs a FAIL.

Alternatively, the threshold may comprise a more complex algorithm. Regardless, though, only one correct correlation point can exist, even though a false correlation point may also pass the threshold level. Thus a more accurate determination is made by rejecting any comparison that has a secondary correlation point which is separated from the primary correlation point. It should be noted that a valid primary correlation point may consist of several adjacent and connected points which all pass the threshold value.

The resulting PASS/FAIL output information can be used for many applications where personnel identification and verification is required.

While the invention has been described with respect to its presently preferred construction and variously considered alternative constructions and modifications thereto, it is to be appreciated that still other modifications might be suggested to those skilled in the art. Accordingly, the invention should be interpreted to include all those equivalent embodiments within the spirit and scope of the following claims.

What is claimed is:

1. Fingerprint identification apparatus comprising:
   a) reference means for storing pre-recorded digital fingerprint reference data taken from a subject;
   b) live fingerprint means for digitizing fingerprint data of a subject and displaying the live data in superimposed relation to the reference data and for correctionally positioning the superimposed live and reference data relative to one another;
   c) first and second FIFO means respectively responsive to the reference and live fingerprint means for each storing data organized into a plurality of rows and columns and sequentially and simultaneously advancing the reference and live data on a row by row basis from an input port to an output port and each including means for recycling each row of data from the output port to the input port and wherein the data of said second FIFO means comprises an $m_x \times m_y$ array and the data of said first FIFO means comprises an $n_x \times n_y$ array and wherein $m_x$ is not equal to $n_x$;
   d) means for comparing the data at each bit position of said reference data relative to a corresponding bit position of said live bit;
   e) means for periodically reorganizing the live data relative to the reference data such that over a plurality of comparison cycles all bit positions of the reference and live data are compared with one another;
   f) means for accumulating a correlation value for each of said plurality of cycles, whereby an $m_x - n_x + 1 \times m_y + 1$ correlation array is obtained; and
   g) means for processing said correlation array relative to a predetermined threshold condition to determine a PASS/FAIL condition.

2. Apparatus as set forth in claim 1 wherein said reference means includes a platen having a first surface whereon a finger is positioned, a second surface exposed to a light source such that the finger is illuminated, and a third surface wherethrough an image of a fingerprint is observed and further including;
   a) a plurality of lenses for focusing the fingerprint image; and
   b) sensor means for producing a binary representation of the analog fingerprint.

3. Apparatus as set forth in claim 2 wherein said plurality of lenses produce an image at said sensor means having an aspect ratio of less than unity along one axis.

4. Apparatus as set forth in claim 1 including alignment means having a reference reticle for correctionaly positioning the live fingerprint image relative to the reticle.

5. Apparatus as set forth in claim 1 wherein said comparison means performs an exclusive OR comparison and wherein said accumulation means determines a total sum for all bit positions of the reference and live data exhibiting a predetermined binary equality.

6. Apparatus as set forth in claim 5 including switch means coupled intermediate said second FIFO means and said comparison means for horizontally shifting in a recirculating fashion the live data a selected number of bit positions.

7. Apparatus as set forth in claim 6 including means for vertically shifting in a recirculating fashion the data of said plurality of rows of live data and wherein a correlation value is obtained for each horizontal and vertical recirculation of the live data relative to the reference data at said second FIFO means.

8. Apparatus as set forth in claim 5 wherein the accumulation means includes means for coupling the output of the comparison means to a counter means for accumulating a running total for each comparison cycle of said apparatus.

9. Apparatus as set forth in claim 1 wherein said accumulation means includes logical AND means coupled to logical exclusive OR means for producing a sum and carry output.

10. Apparatus as set forth in claim 1 wherein said periodic reorganization means horizontally and vertically shifts the live data of said second FIFO means.

11. Apparatus as set forth in claim 1 wherein $m_x > n_x$.

12. Apparatus as set forth in claim 1 wherein $m_x > n_x$.

13. Fingerprint identification apparatus comprising:
   a) first FIFO means for storing digital fingerprint reference data taken from at least one predetermined finger of a subject and aligned into an $n_x \times n_y$;
   b) second FIFO means for storing live digital fingerprint data of a subject aligned into an $m_x \times m_y$ array;
   c) means coupled to said first and second FIFO means for sequentially and simultaneously advancing row by row the reference and live data from an input port to an output port of each of said first and second FIFO means and for recycling said data from each output port to each input port where $m_x$ is not equal to $n_x$;
   d) means coupled to the output port of each of said first and second FIFO means for performing an exclusive OR comparison of each bit position of said reference data relative to a corresponding bit position of said live data;
   e) means for determining a correlation value for each comparison cycle and accumulating said values into an $(m_x - n_x + 1) \times (m_y - n_y + 1)$ array;
   f) means for selectively and periodically shifting a plurality of rows of the live data relative to the reference data a selected number of bit positions and wherein the selected data is shifted in a recirculating fashion whereby over a plurality of comparison cycles all bit positions of the reference and live data are compared with one another; and
   g) means for processing said $(m_x - n_x + 1) \times (m_y - n_y + 1)$ array relative to a predetermined threshold to determine a PASS/FAIL condition.

14. Apparatus as set forth in claim 13 wherein the accumulation means comprises means for segmenting the output of the correlation value determining means into a plurality of sectors and including decoder means having a plurality of storage locations, each storage location having a unique address corresponding to one of a plurality of possible binary states for each sector and containing data corresponding to a number of bit matches at each sector and further including means for selecting and summing the data of each of said plurality of sectors for each comparison cycle.

15. Apparatus as set forth in claim 14 wherein the decoder means comprises a programmable read only memory.

16. Apparatus as set forth in claim 14 wherein said summing means comprises a plurality of cascaded adder means for summing all bit positions over a plurality of sequential summations.

17. Fingerprint identification apparatus comprising:

a) first FIFO means for storing digital reference fingerprint data taken from at least one predetermined finger of a subject and aligned into an $n_x \times n_y$ array;

b) second FIFO means for storing digital live fingerprint data of a subject and aligned into an $m_x \times m_y$ array and wherein $m_x > n_x$;

c) means coupled to said first and second FIFO means for sequentially and simultaneously advancing row by row the reference and live data from an input port to an output port of each of said first and second FIFO means and for recycling said data from each output port to each input port;

d) means coupled to the output port of each of said first and second FIFO means for performing an exclusive OR comparison of each bit position of said reference data relative to a corresponding bit position of said live data;

e) means for determining a correlation value for each comparison cycle and accumulating said values into an $(m_x - n_x + 1) \times (m_y - n_y + 1)$ array;

f) means for selectively and periodically shifting a plurality of rows of the live data relative to the reference data a selected number of bit positions and wherein the selected data is shifted in a recirculating fashion whereby over a plurality of comparison cycles all bit positions of the reference and live data are compared with one another; and g) means for processing said correlation array relative to a predetermined threshold to determine a PASS/FAIL condition.

* * * * *